United States Patent [19]

Fishgal et al.

[11] Patent Number: 4,753,833

[45] Date of Patent: Jun. 28, 1988

[54] HOLLOW ARTICLE WITH ZIGZAG PROJECTIONS

[76] Inventors: Semyon I. Fishgal; Aleksander S. Fishgal; Irina G. Pass-Fishgal, all of 1908-35 High Park Ave., Toronto, Canada, M6P 2R6

[21] Appl. No.: 911,737

[22] Filed: Sep. 26, 1986

[51] Int. Cl.$^4$ ............................................. B32B 3/20
[52] U.S. Cl. .................................... 428/36; 428/188; 165/133; 165/182; 138/121; 138/173
[58] Field of Search .................... 428/36, 186, 188; 138/121, 122, 129, 173, 105; 165/133, 177, 182, 184

[56] References Cited

U.S. PATENT DOCUMENTS

| | | | |
|---|---|---|---|
| 2,667,337 | 1/1954 | Chapman | 165/184 |
| 2,876,801 | 3/1959 | November | 138/121 |
| 3,122,171 | 2/1964 | Britton et al. | 138/122 |
| 3,260,652 | 7/1966 | Ritz et al. | 165/182 |
| 3,747,352 | 7/1973 | Maroschak | 138/105 |
| 3,866,286 | 2/1975 | Pasternak | 165/133 |
| 3,891,007 | 6/1975 | Kleykamp | 138/121 |
| 4,085,491 | 4/1978 | Mathwig | 165/184 |
| 4,168,618 | 9/1979 | Saier et al. | 72/71 |
| 4,232,712 | 11/1980 | Squires | 428/36 |
| 4,362,187 | 12/1982 | Harris et al. | 138/109 |
| 4,435,460 | 3/1984 | Menzel | 138/122 |

Primary Examiner—John E. Kittle
Assistant Examiner—Beth A. Bozzelli

[57] ABSTRACT

A tubular article with circumferential projections having radial or chordal corrugations. The chords have tooth-like formations or are parallel and directed vertically in underground installation. In the last case, the sides of the tube can be devoid of the corrugations, or have them radially or tooth-like. Furthermore, the projections can be skewed and alternating in the opposite directions. Also, the projections can have offset planes. Finally, in case of two corrugations, they are diametrically opposed in a single chordal direction and are represented by rings bent parallel to the applicable load which is adverse with thus prestressed projections.

3 Claims, 2 Drawing Sheets

HOLLOW ARTICLE WITH ZIGZAG PROJECTIONS

BACKGROUND OF THE INVENTION

This invention relates generally to hollow articles having a tubular portion (such as pipes, fittings, vessels, heat exchangers, bottles, containers, casings, cans, drums, etc.). Particularly it pertains to that portion consisting of an essentially smooth wall braced with a plurality of continuous projections like ribs and fins oriented substantially transversely to the longitudinal axis of said portion.

Such tubings are disclosed in many patents, for example U.S. Pat. No. 4,168,618 illustrates, inter alia, Y- and T-finned metal tubes for heat exchangers, U.S. Pat. Nos. 3,891,007 and 4,362,187—thermoplastic ribbed tubes.

A composite tube comprises two coaxial tubes with intermediate fins (an internally finned tubing, or a pipe with internal fins). The fins are attached by means of a mechanical tension or a metallurgical bond (soldering, brazing, etc.).

In heat exchangers, finned pipes meet high temperature requirements, improve heat exchange (because of the increased surface) and can have unique configurations, such as unusual compound bends, serpentine, spiral and helical coils. The materials for these tubings are stainless steel, copper, hastelloy, copper-nickel, admiralty, incoloy, aluminum, titanium, carbon and low alloy steel, etc. The applications of such heat exchangers include home appliances, air preheaters, steam condensers, oil coolers, generator coolers, tank heaters, heat recovery units, aerospace, cryogenic exchangers, home heating and cooling, industrial heat exchangers, immersion heaters, intercoolers and aftercoolers for air compressors, gas compressors and gas turbines, etc.

With the advent of agriculture, railroads, highways, airports, athletic fields, stadiums, recreational grounds and residential construction, plastic pipes have become increasingly important.

Subsurface drainage becomes the key to successful farming. It improves considerably the economic return of farm land, gives significantly higher and more reliable crop yields, permits farming of the land once considered unfit or unprofitable for agriculture, allows the planting season to start 2-3 days earlier (which leads to 10-25% increase in yields over undrained land), and in a wet year, can make the difference between a crop failure and success.

In farming, corrugated pipes are used for subsurface field drains (laterals and collector mains), for culverts (entrances and ditch crossings), subsurface irrigation and grain storage aeration.

Prior to plastic pipes, handling, shipping and installation of drainage systems were expensive and time-consuming. Metal culverts, clay and concrete tiles commonly used for this purpose required the piecing together of the large number of relatively short individual lengths (that is why such systems were vulnerable to misalignment) with extreme care to avoid breakage of the comparatively brittle tile material. Freezing and large farm machinery placed on the soil above the drainage tile may result in high compressive stresses. Not having effective deflection, such a tile must possess an extremely elevated load bearing strength resulting also in heavy weight. The fractured tile allows soil to enter the drainage system and at best decreases its capacity.

Until the soil fills in the void underneath the round tile, there may also be a subsequent shifting and misaligning of the tiles. This can lead to excessive soil falling between the drainage tiles and clogging or hampering the capacity of the drainage system. Also, shifting and changing contour of the supporting media require optimum flexibility.

Further disadvantages of the ceramic tile are its rigidity requiring elbows and high weight prohibiting its manipulation by an individual.

Plastic pipes, in contrast, deflect without harmful effects (the effective load bearing strength being greatly increased), are light and flexible, but strong, easily installed, shipped, stored and handled, abrasion resistant, do not corrode, rot or rust, are not affected by alkaline or acidic conditions and have good cold weather characteristics after installation below grade. Moreover, the material used is virtually nondestructive by shifting and is less expensive.

In comparison with smooth pipes, the ribbed tubings are added in strength and load bearing capacity by the projections, and negotiating curves without elbows or other fittings. This allows the use of such pipes even for small contractors and residents.

At first glance, it might appear that a light weight thin-walled ribbed plastic pipe cannot be specified for the drainage structures with severe strength requirements and adverse installation conditions because of its flexibility. However, it is the latter that allows to sustain exceedingly heavy loads. Since under external loads the pipe is considerably deflected outward, it is restrained by the surrounding soil when buried. Consequently, the passive resistance of the soil equalizes and distributes the external pressure around the pipe. That is why such a buried pipe can support large loads on the ground.

The light weight of such plastic pipes reduce operator fatigue, increase productivity, allow their transportation into areas inaccessible to trucks with heavy clay or concrete pipes and can even be manhandled.

Thus, the finned tubing is stronger, than the smooth one of the same weight and diameter, or lower in weight if it is of equal structural strength. Since the cost is essentially proportional to the weight per length, the finned tubing is many times cheaper. Also, smooth pipes, being longitudinally stiff, work as a beam, whereas finned pipes, being longitudinally more flexible, easily conform to the trench. Furthermore, more flexible circular cross-sections of the pipe develop a sidefill support of an envelope (a crude masonry arch) and should not be as strong as the stiff pipe.

In residential and commercial construction, drainage tubing is used for exterior and interior of foundation, underslabs, downspout run-offs, yard and lawn low spots, basements and window wells, driveways, sidewalks, parking lots, septic tank leach fields, driveway culverts. Finned tubing can be also used for underground utility line conduits, underslab airducts, sludge composting and aeration.

In residential and commercial foundation drainage, such tubing placed under the slab inside and around outside the basement or foundation carries off ground water preventing frost damage and basement slippage. The drainage tubing placed under patios, sidewalks and driveways helps during freeze-thaw cycles.

In foundations with high water table and rains, exterior (and some times, interior) foundation drains are placed below the level of the lowest floor to collect channel water away from footers and basement walls to a suitable outlet.

Downspout run-off plastic drains discharge water collected in the roof gutters into storm sewers, the curb at the edge of the street, etc.

In a basement window well, plastic drain pipes dispose rainwater and prevent it from seeping down the foundation into the basement.

Driveway and sidewalk plastic underdrainage prevents frost damage and pavement deterioration by stabilizing its base.

In low-spot drainage of lawns and yards plastic tubing collects and carries water to a storm sewer or other disposal means.

The outstanding performance and labor-saving of ribbed plastic tubings allow to replace metal conduits in the protection of communication and power lines (fiber optics and cables) in control boxes and panels, machinery, vehicles, buildings, constructions, above and in the ground, in walls, ceilings, floors, in indoor, outdoor and damp applications (greenhouses, laundries, etc.), in corrosive atmospheres, even in exposed forms where not subject to physical abuse, usually up to 600 volts.

Such plastic products provide an optimum balance of toughness, strength, crush and impact resistance, superior environmental stress cracking immunity, a low friction coefficient, a minimum drag during cable insertion, longer pulled-in-place lengths, light weight, flexing and bending (even at low temperatures). This allows easy handling, adaptation to other systems, inserting the tubing into an outerduct or communication lines inside it and assembly in a confined space, the necessity of elbow fittings being frequently eliminated. There are no fatigue, rust, rot, pit, corrosion or reaction to oil and surrounding soil (wether acid, alkaline, wet or dry), no jagged edges causing injuries.

Although such pipes are mostly flame retardant, self extinguishing and do not support combustion, it is admitted that burning plastics is hazardous and gives off, among other things, hydrogen chloride (a corrosive gas, lethal in high concentrations). However, noncombustible metal conduits are even worse in this respect because of possible electrical short circuits (as a result of improperly grounded metal conduits or fire during which metal conducts the heat to the cable insulation).

In utility installations, plastic tubing is used for water conduits, house drainage systems and septic tanks.

The pipes with openings (usually cylindrical holes) much larger than in drainage systems are used as a drainage pipe with a septic tank leach bed. Such a pipe is most applicable for the dispersal of wastewater effluents from septic tanks, sewage treatment plants, farm waste treatment lagoons, etc. into the ground through a system of soakage trenches.

Since radial projections prevent kinking, ribbed plastic tubings are used as inhaler tubes, respiratory pipes, gas masks and oxygen helmet tubings in medical and personal equipment.

Also, finned polytetrafluoroethylene, nylon, polyester and polypropylene tubings are used (instead of woven or knitted fabrics) as vascular graft prostheses replacing arteries and veins. Such a prosthesis is chemically inert to body fluids, body- and blood-compatible, non-carcinogenic, non-antigenic, resistant to mechanical deterioration, collapse and crushing, have good suture holding characteristics and conformability for fitting the exact anatomical position without occlusive kinking or pinching from external pressure (the ribs permitting the graft to be bent without kinking and blocking the blood flow). This pipe is capable of being sterilized, is easily implantable and has a uniform porosity allowing (without the blood leakage) tissue ingrowth from the outside and diffusion through the wall for nourishing the neointima on the inside surface.

Flexible plastic hoses solve many problems of ductwork installation: vibration dampening, connecting rigid ducts and equipment, compensating for misalignment between rigid duct ends, absorbing length changes in rigid ducts due to temperature variations, serving as removable elbows in runs of rigid ductwork, etc. That is why such pipes have found applications in ducts for duct collection, gravity drops and feeds, handling air and airborne particles and materials, street cleaning, leaf loading, sawdust, wood and metal chip collecting, rock dust exhausting, fumes exhausting, grain and flour dust handling, aeration for grain storage, plastics processing, etc.

Ribbed plastic tubing is utilized as a vacuum cleaner hose and similarly in swimming pool equipment. Here the required flexibility, small resistance to turning, withstanding the crushing effect of being stood upon or shut in a door, high resistance to collapse when looped and pooled, cannot be met by smooth pipes.

Cold and hot metal pipes are insulated with longwisely splitted snap-on plastic tubings without any adhesives, air pockets between the latter and the pipe imparting the insulating effect. This protects hot water pipes from heat loss and prevents condensation on and resultant dripping from cold water pipes. One or several concentrically mounted tubings can be used for better protection. Also, such a tubing can be used as a cover over regular insulation.

Among other numerous applications, the following should be mentioned: highways and roads (berm and roadway underdrainage, culverts), railroads (railbed and roadway-crossing drainage, switching yard underdrainage and culverts), airports (runway, underdrains, collector drains, site subsurface drainage and culverts), engineering structures (dams, levees and toe drains, dredge spoil dewatering), mining (sand, gravel and coal pile underdrainage, air ducts, water removal), golf courses and athletic fields (field, running-tract and golf-course drainage).

SUMMARY OF THE INVENTION

With advances in the development and application of finned tubes, particularly where deeper profiles are called for, the relative thickness of the wall in proportion to the tube diameter and profile is reduced, thus increasing the propensity towards ribs buckling.

The major objective of this invention is to overcome this defect and to enhance the withstanding of deep projections (collapsing readily when loaded) to compressive forces and to provide the maximum strength with the least amount of the material by augmenting their crushing resistance.

The minor objective is to enhance the heat dissipation in case of the corrugated heat exchangers.

Above objectives are achieved by strengthening said projections with a plurality of corrugations extending on the latter so as to form zigzag-like paths of the projections, to impart rigidity to them and to prevent their buckling under bending induced radial and shear load.

Thus, the projections, instead of being plain, are corrugated and provide the desired structural stability even though the material itself is relatively thin and light. This increases the effective-load bearing capacity per unit of the tubing material. Since the surface area of the tubes is thus increased, the heat exchange functions are also enhanced. Also, the heat dissipation is added by the turbulence induced by the corrugations.

It should be mentioned, however, that in heat exchangers, the stiffening of the projections can lead to additional thermal stresses.

Said corrugations can be projected radially or be directed as linear or arcuated chords. At this, the chords can either form tooth-like corrugations, or be parallel to each other and directed vertically in underground installation. In the last case, the sides of the tubular portion can either be devoid of the corrugations, or can have the latter radially projected or tooth-like.

Said paths can be parallel to or independent from each other.

If the article is split molded in two complimentary molds having a longitudinal parting surface (like in U.S. Pat. No. 3,891,007), the outer surfaces of said corrugations do not form shadowing areas so as not to impede the separation of the molds.

Also, said corrugations can be represented by the projections having their flanks skewed alternatively about the path of said corrugations in such a manner that an applicable load would deform two adjacent corrugations in the mutually opposite directions. At this, the skewed flanks form an acute angle with its apex directed inward or outward the tubular portion.

If said corrugations are curved, the skewed flanks are represented by semi-tapers directed inward or outward the tubular portion.

Furthermore, the corrugations can be represented by the projections having offset planes.

Finally, the paths can have two said corrugations which are diametrically opposed relative to the longitudinal axis of the tubular portion, have a single chordal direction and are represented by rings bent parallel to the applicable load which is adverse with thus prestressed projections.

A more complete appreciation of the present invention and the distinguishing characteristics, objectives and attendant advantages thereof set out herein are more apparent and obvious to one ordinarily skilled in the art from the following detailed description, drawings and appended claims.

DESCRIPTION OF THE PREFERRED EMBODIMENTS

Figure 1:
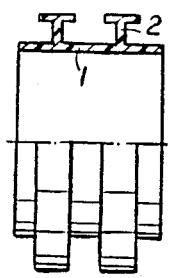
FIG. 1 is a longitudinal section of the known tubular portion (prior art) with exemplary T-shaped radial projections (a single-wall pipe)

The tubing of the present invention is represented by an essentially smooth wall 1 braced with circumferential outside radial projections 2 (such as ribs, fins, etc.) oriented substantially transversely (including helicoidally) to the longitudinal axis of the tubular portion. The projections 2 are corrugated in any suitable shape. The corrugations form zigzag-like paths of the projections, are conterminous with crests 3 and roots 4 of the tubular portion and form a curved edge that marks the transition of the surfaces. The shape of the corrugations can be rectangular, square, trapezoidal, sawtooth, round and combinations thereof. As an example, the sawtooth corrugations are shown in FIGS. 3 and 6, the round ones—in FIG. 5, the trapezoidal corrugations with rounded roots—in FIG. 4.

The cylindrical cross-section of the pipes shown in the drawings is most common, although a tubing with an arcuated top and a relatively flat base (similarly to the tube of U.S. Pat. No. 3,681,925) can be used. Such a tube has less obstructed water flow and better conforms to the trench in which it rests, although it is not so strong as the cylindrical pipe.

Figure 5:
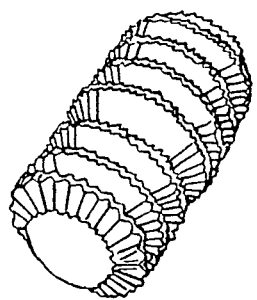
FIG. 5 is a perspective view of the tubular portion of an alternate embodiment of the present invention with exemplary round corrugations.
Figure 3:
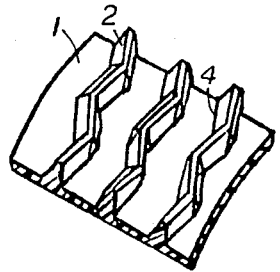
FIG. 3 is an enlarged perspective partial view of the wall of the tubular portion of the present invention, with exemplary trapezoidal zigzag-like radial projections (by way of illustration, but not of limitation), the latter being in parallel paths.
Figure 6:
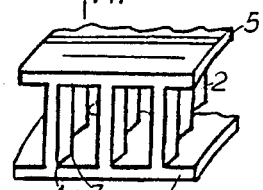
FIG. 6 is an enlarged perspective partial view of a double-wall of the tubular portion of still another embodiment.
Figure 13:
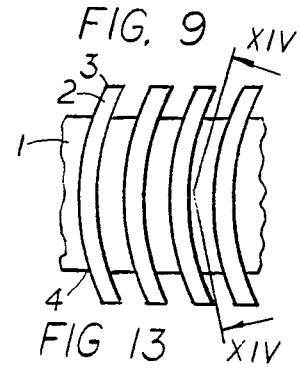
FIG. 13 is a longitudinal view of the tubular portion of an alternative embodiment with two secondary corrugations.
Figure 12:
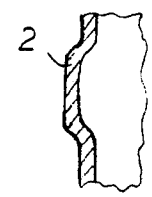
FIG. 12 is a longitudinal view of an alternative tube with the projections having offset planes.

The zigzag paths of the corrugations are shown parallel to each other in FIGS. 3, 6 and 13, and independent from each other—in FIGS. 5 and 12.

Figure 2:
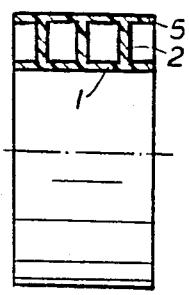
FIG. 2 is the same as above for a double-wall tubing with projections between the walls (an internally finned pipe)
Figure 7:
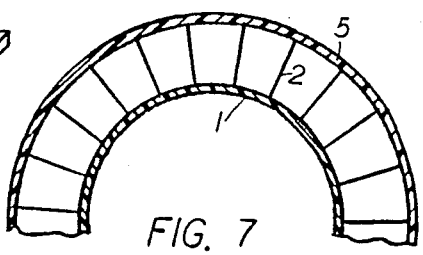
FIG. 7 is a cross-sectional view of the tubular portion taken along line VII—VII of FIG. 6.

The internally finned pipe of FIGS. 2, 6 and 7 has the inner wall 1 kept with a gap in the outer coaxial wall 5 by means of internal fins 2.

The tube can be provided with a smooth outer wall 5 (FIGS. 2, 6 and 7), the tubing ribbed/finned inside (not shown) being applied (for example, as a cable casing) seldom.

Figure 4:
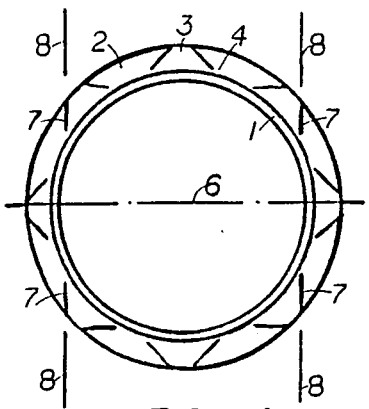
FIG. 4 is a cross-sectional view of the above tubular portion.

The tubing manufactured in a continuous process (such as that of said U.S. Pat. No. 3,891,007) is molded in two complimentary mold train systems having a longitudinal parting surface along a line 6 (FIG. 4). In this case, the outer surfaces 7 of the corrugations can be made without shadowing areas created by beams 8 perpendicular to the line 6 so as not to impede the separation of the molds.

Figure 8:
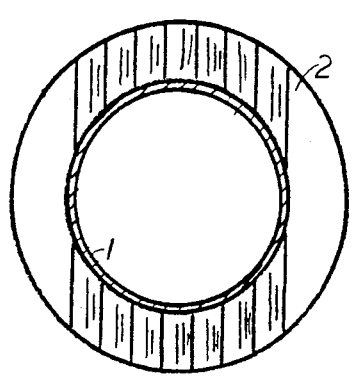
FIG. 8 is a cross-sectional view of the tubular portion of an alternative embodiment with parallel corrugations.

The corrugations can be projected radially (FIGS. 5-7) on the projections 2 or be directed as chords (FIGS. 4-8). At this, the chords can either form tooth-like corrugations (FIGS. 4 and 9), or be parallel to each other and directed vertically in underground installation (FIG. 8). In the last case, in order not to diminish the resistance of the side walls of the tubing to the horizontally directed deformation, the sides of the tubular portion can either be devoid of the secondary corrugations (FIG. 8), or can have them radially projected or tooth-like (the last two variants not shown in the drawings).

Figure 9:
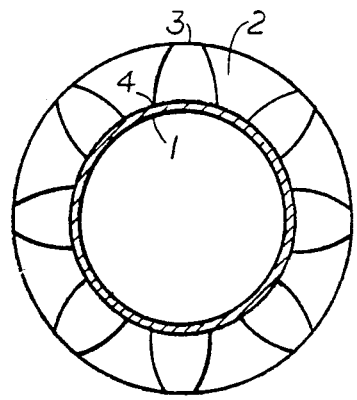
FIG. 9 is a cross-sectional view of the tubular portion of another embodiment with tooth-like corrugations.

The chords can be either linear (FIGS. 4 and 8) or arcuated (FIG. 9).

Figure 10:
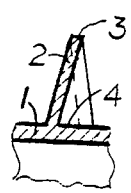
FIG. 10 is a cross-section of the projection of still another embodiment with the flanks skewed outward the tube.
Figure 11:
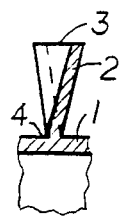
FIG. 11 is the same as above, the flanks skewed inward the tube.

Also, the corrugations can be represented by the projections 2 having their flanks skewed alternatively about the path of the corrugations in such a manner that an applicable load would deform two adjacent corrugations in the mutually opposite direction (FIGS. 10 and 11). The skewed flanks form an acute angle with its directed outward (FIG. 10) or inward (FIG. 11) of the tube. In the first case, the projections are roughly equivalent to the trapezoidal ribs of the standard pipe of ASTM F 794-83. Thus, this execution stiffens the transition between the projections 2 and the pipe 1 and can be recommended for the compressed projections.

For the projections having tensile stresses, it is better to strengthen the periphery (FIG. 11). In this case the projections are roughly equivalent to an inverted trapezoidal rib.

If the corrugations are curved, said skewed surfaces are represented by semi-tapers, which can alternate as above.

Furthermore, the corrugations can be represented by projections 2 having offset planes (FIG. 12).

Figure 14:
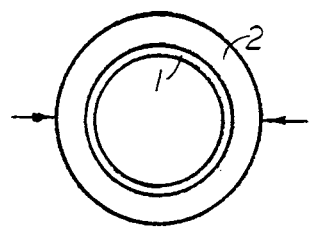
FIG. 14 is a cross-sectional view of the above tubular portion taken along line XIV—XIV of FIG. 13.

Finally, the paths can have only two corrugations which are diametrically opposed in relation to the longitudinal axis of the tubular portion (FIGS. 13 and 14). These two corrugations have a single arch with a single chordal direction and are represented by rings bent parallel to the applicable load which is adverse with thus prestressed projections (the load direction is shown by arrows).

The proposed tubing is applicable more than conventional plastic tubing in the public sewage systems. Here plastic tubing has not acquired yet a dominant position due to the requirements to their long-term stability.

Since sewage pipes are only exposed to the outer pressure of the circumferential load of soil and traffic, but not to the inner pressure of the liquid content, their application is limited mostly by the buckling strength and allowable deflection in the diametrical direction. These parameters are higher in the present tubing.

Apart from this mechanical load, sewage pipes are exposed to aggressive soils, corrosive ground and sewage waters and to hydrogen sulphide formed by microorganisms. In this connection plastic tubing is more preferable than unprotected steel, concrete and the like pipes, although the chemical exposure can be overcome by appropriate coatings.

Rigid and flexible underground conduits behave fundamentally differently under vertical live (e.g. vehicles) and dead (soil cover) loads. The rigid pipes increase load concentration at their crown and do not induce load distribution, stress relaxation and the additional supporting soil reaction (especially with not properly compacted soil in the pipe and haunching zones). Therefore, rigid pipes may not be significantly deformed due to possible brittle cracks, rapture and failure.

The flexible pipes sustain large deformations, the vertical load creating the vertical deflection (dependent on the soil compaction around the pipe) because of the pipe stiffness. This relieves the load concentration and mobilizes the soil support forces, the pipe materials being ductile enough to prevent rupturing, cracking and crushing without buckling collapse under vertical deflections up to 30% of the pipe diameter. Thus, the deflection control is the basic design consideration for flexible conduits.

The soil pressure increases the horizontal diameter of the pipe and decreases its vertical diameter. These deformations are desirable to some extent and without them the pipe-soil system would not perform adequately.

Under the soil pressure reaction and the resultant support of the surrounding soil (the soil and pipe interaction), buried ductile (not necessarily plastic) tubings can withstand the same loads as rigid pipes, the decisive design criterion being the soil stiffness (if a soil arch similar to the masonry one is created) and the ring stiffness (per unit pipe length)

$$R = EI/r^3,$$

where
 E is the modulus of elasticity (flexural modulus) of the pipe material,
 I is the moment of inertia per pipe unit length:

$$I = t^3/12,$$

r is the mean (in case of the composite pipe) radius,
t is the wall thickness.

The pipe stiffnesses of both the pipe ring and the soil can be used to calculate approximate deflections under earth load by the following modified Sprangler equation:

$$x = \frac{D_e K W_c}{0.149(PS) + 0.061E'}$$

where
 x is deflection of pipe, mm (in.),
 K is bedding constant, dependent upon the support the pipe received from the bottom of the trench:

(K=0.08−0.11), $W_c$ is vertical load per unit of pipe length, N/m (lbf/in) of pipe,
 $D_e$ is deflection lag factor ranging between 1.0 and 3,
 E' is modulus of soil reaction, kPa (psi),
 PS is pipe stiffness (the force per unit length of a specimen divided by the resulting deflection at the prescribed percentage deflection), kPa (psi):

$$PS = CF/\Delta y = (1 + \Delta y/2d)^3 F/\Delta y,$$

$$EI = 0.149r^3 (PS).$$

F is load,
$\Delta y$ is change of the initial diameter in the direction of the load application,
C is the correction factor,
d is the initial diameter.

In other words, the pipe stiffness is the slope of the load-deflection curve (although the pipe stiffness units are dimensionally the same as those for pressure and stress, they are not interchangeable).

The stiffness of the pipe is a function of its dimensions, the physical properties of its material, its handling, installation, soil consolidation around the pipe and the degree of its deflection.

During backfilling and compaction of the bedding, flexible pipes deform ellipticaly or rectangularly (depending on the pipe and soil stiffnesses). As the pipe deflects the radius of curvature changes, the greater the deflection, the greater deviation from the true EI value. By application of the correction factor C, PS can be related to the true EI of the pipe as long as the latter remains elliptical.

The latter equation (particularly, the 0.149 coefficient) predicts the deflection under the parallel-plate loading, but not under the soil reaction.

The moment of inertia for rectangular corrugations and their approximations:

$$I = \frac{h^3 t}{6P} + 0.25 h^2 t + t^3/12,$$

where
h is the corrugation depth,
P is pitch.

Conduits installed underground with the water level above the pipe and underwater (e.g. rivers) should be checked for buckling stability (hydrostatic collapse) under radial hydraulic pressure $$p = \frac{E t_e^3}{r^3(1-n^2)} = \frac{3EI}{r^3(1-n^2)},$$

where
$\rho$ is poisson's ratio,
$t_e$ is equivalent wall thickness for the solid pipe.

Since plastic pipes creep under long-term strain conditions (depending on loading time, stress and temperature), the creep modulus $$E_{cr} = f(T, E_c t')$$

should be used in such long-term calculations.

The load-deflection characteristics of plastic pipes are found-out under parallel-plate loading and determine the pipe stiffness, stiffness factor, the load and deflection at any of the significant events (linear crack or craze, wall crack, delamination of pipe wall and rupture) when and if they occur.

The impact resistance of the proposed tubing is almost the same as that of the full thickness smooth pipe, which allows 25% savings in the material. The test procedure lies in fracturing the sample under a tap falling on a rib or in the pipe reduced thickness, without any preference. The median height of the fall at which the fracture occurs and the standard deviation of this height are calculated to known formulas of the statistical analysis.

The method of parallel-plate loading lies in loading a short length of the pipe between two rigid parallel flat plates at a controlled rate of approach to one another. The external loading properties of the pipe obtained by this method are used to determine the stiffness and load-deflection characteristics for engineering design, to compare the characteristics of various plastics in the pipe form, to study the interrelations of dimensions and deflection properties of pipes and conduits, to measure the deflection and load-resistance at any of several said significant events which may occur during the test.

For the same pipe weight, the ribbed tubing is 40% stiffer than the plain one of the reduced thickness.

It should be mentioned, however, that a long-term load increases the deformation of the plastic pipes, tending to creep, in contrast to the conventional pipes. Thus, in long term strain conditions plastic pipe can become stressed excessively. Excess tensile and compressive stresses can accordingly lead to cracking and localized buckling of the pipe wall, especially when the pipe is buried deeply, where hydrostatic conditions exist and excessive pipe deformation and deflections might develop.

Total tensile strain:

$$E_t = E_b - (E_s + E_h),$$

where
$E_b$ is tensile strain from pipe bending in either diametric, axial or combined situations,
$E_s$ is compressive strain induced into the pipe walls by the soil weight above the pipe (this can diminish in time as the pipe creeps and the enveloping soil forms a soil bridge),
$E_h$ is external hydrostatic compressive strain.

Total compressive strain:

$$E_c = E_b + E_s + E_h.$$

Evidently, the projections height and thickness are the most important parameters in the pipe design for the given stiffness and weight. Up to a certain limit, the larger pitch saves the material without significant losses of the stiffness.

It should be mentioned that above mathematical models are optimistic for steep projections.

For materials of plastic pipes with a smooth interior, a hydrostatic design basis is obtained by evaluating stress rupture test data derived from testing the pipe.

In order to make allowance for the basic stress-strain characteristics of the material in relation to time at a given temperature (the results cannot be used for other temperatures with any certainty), said data include long-term hydrostatic strength at 100 000h and 50 years, and stress giving 5% expansion at 100 000h.

Hydrostatic design stresses are obtained by multiplying the hydrostatic design basis values by a service (design) factor.

The 50-years stiffness rates of the proposed tubing can be twice of that for the plain pipe of the same weight.

Since the given tubing has no advantages in the withstanding of bursting fluid pressure, its pressure ratings can be calculated from the hydrostatic design stress value for the specific material (without taking into account the projections):

$$S = p(OR/t - 1) = p(IR/t + 1),$$

where
S is the hoop stress (the tensile stress in the wall of pipe in the circumferential orientation due to internal hydrostatic pressure),
p is the inside pressure (the force per unit area exerted by the medium in the pipe),
OR and IR are the outside and inside diameters of the smooth pipe,
t is the wall thickness.

For drainage purposes, the pipes are provided with openings (such as circular perforations and slots) for communication between their interior and exterior. In most cases the only requirement to the openings is that a certain open area be provided which is although enough for the communication, but prevents foreign matter from entering the pipe interior. Usually, the openings are smaller in size than the width of the valleys between the projections. Slots are considered to be more preferable than circular perforations because single particles clogging a round hole are less likely to choke the entire length of the slot.

The hydraulic resistance to the inflow and outflow via the openings depends on their quantity, since they bend, elongate and condense the lines of the flow. The less distance between the openings, the less bending, elongating and condensing occur, an ideal drainage pipe being represented by a porous pipe. The latter can be approximated with a pipe having increased quantity of openings and a filter.

While there has been described and pointed out the fundamental novel feature of the invention as applied to the preferred embodiments, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. A hollow article subjected to an external radial load and having the shape defined by a tubular wall with an inner surface, said wall and an outer surface braced with generally transverse and circumferential ribs projecting outwardly from the outer surface and having corrugations imparting rigidity to the ribs, preventing the ribs from buckling under bending induced radial and shear loads and substantially averting caving in of the ribs, the critical mode of the article failure being the buckling of the ribs, and the wall providing semirigid response to loading therealong, wherein in the cross-section of the tube said corrugations form chordal lines not crossing the longitudinal axis of the tube, said lines being selected from the group consisting of lines forming radial-tooth-like corrugations and parallel lines directed vertically to said axis when the article is buried underground, and wherein the corrugations with said parallel lines are located on the tube in an area defined by that which is between two vertical lines tangent to the tube at the horizontal axis, and the remaining regions of the tube located on the opposite sides vertical of said lines being devoid of corrugations, having radial projected corrugations or having tooth-like corrugations.

2. A hollow article subjected to an external radial load and having the shape defined by a tubular wall with an inner surface and an outer surface, said wall braced with generally transverse and circumferential ribs projecting outwardly from the outer surface and having corrugations imparting rigidity to the ribs, preventing the ribs from buckling under bending induced radial and shear loads and substantially averting caving in the ribs, the critical mode of the article failure being the buckling of the ribs, and the wall providing semirigid response to loading therealong, wherein said corrugations are represented by projections on the ribs having offset planes.

3. A hollow article subjected to an external radial load and having the shape defined by a tubular wall with an inner surface and an outer surface, said wall braced with generally transverse and circumferential ribs projecting outwardly from the outer surface and having corrugations imparting rigidity to the ribs, preventing the ribs from buckling under bending induced radial and shear loads and substantially averting caving in the ribs, the critical mode of the article failure being the buckling of the ribs, and the wall providing semirigid response to loading therealong, wherein the tube is provided with a concentric outer substantially smooth tube wall member having an inside diameter substantially equal to an outside diameter of and being in intimate contact with the corrugated ribs along at least some of the largest outside diameter surfaces thereof.

* * * * *